(No Model.)
B. D. McDOWELL.
PIPE CRIMPER.
No. 435,764. Patented Sept. 2, 1890.
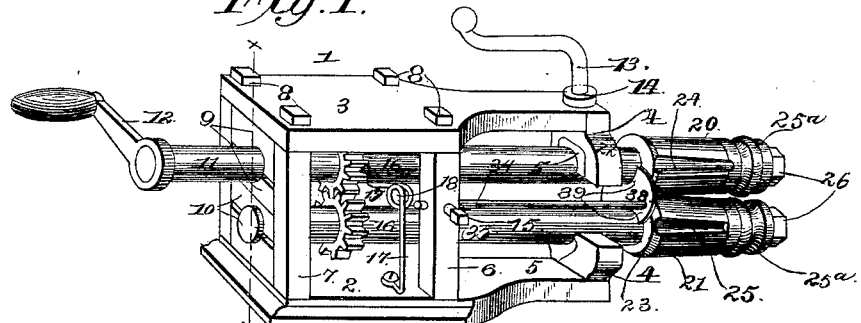
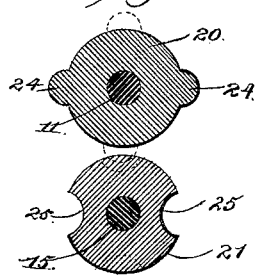
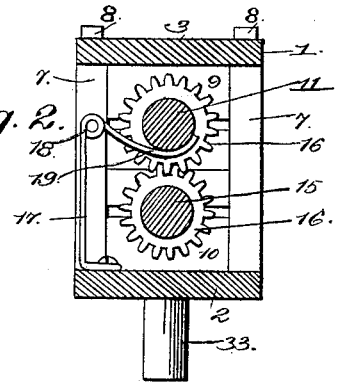
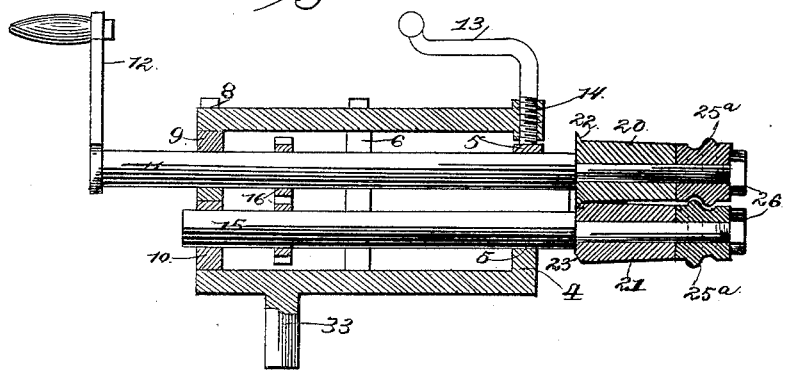
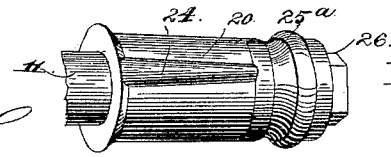
Witnesses:
M. Fowler
W. J. Duvall
Inventor
Bartley D. McDowell
By his Attorneys,
C. A. Snow & Co.
THE NORRIS PETERS CO., PHOTO-LITHO., WASHINGTON, D. C.

UNITED STATES PATENT OFFICE.

BARTLEY D. McDOWELL, OF MORRISON, ILLINOIS.

PIPE-CRIMPER.

SPECIFICATION forming part of Letters Patent No. 435,764, dated September 2, 1890.

Application filed August 17, 1889. Serial No. 321,086. (No model.)

*To all whom it may concern:*

Be it known that I, BARTLEY D. MCDOWELL, a citizen of the United States, residing at Morrison, in the county of Whiteside and State of Illinois, have invented a new and useful Pipe-Crimper, of which the following is a specification.

This invention has relation to that class of metal-working machines known as "pipe crimpers and beaders," and employed for operating upon stove and other sheet-metal pipe sections for the purpose of adapting the ends thereof to interlock.

The objects and advantages of the invention will hereinafter appear, and the novel features and combination of parts be particularly described, and pointed out in the appended claims.

Referring to the drawings, Figure 1 is a perspective of a machine constructed in accordance with my invention. Fig. 2 is a transverse section of the same; Fig. 3, a longitudinal section. Fig. 4 is a transverse section on line *x x*, Fig. 1. Fig. 5 is a detail enlarged view of the crimping-rolls.

Like numerals of reference indicate like parts in all the figures of the drawings.

1 represents the frame-work of the machine, and the same consists of a base 2 and an upper superimposed plate 3, the ends of the base and plate terminating in outwardly-disposed bearing-arms 4, having bearings 5 oppositely disposed. From the base 2 rise front and rear standards 6 and 7, respectively, the upper ends of which are threaded and passed through the plate 3, which plate is bound upon the standards by binding-nuts 8, threaded on the standards.

Between the rear standards 7 are mounted movable half-bearing blocks 9 and 10, the upper pair 9 carrying a longitudinal crank-shaft 11, having an operating-crank 12 at one end and passing longitudinally through the machine and bearing upwardly in the upper adjustable bearing-block 5, said bearing-block being operated by an adjusting crank or screw 13, taking vertical bearings in a threaded opening 14, formed in the projecting arm of the superimposed plate 3. The lower of the pair of bearing-blocks 10 is provided with a longitudinal shaft 15, the rear end of which terminates in said blocks 10 and the forward end of which is projected to correspond with the shaft 11 and has intermediate bearings in the lower or fixed bearing 5. Each of the shafts 11 and 15 is provided near its rear end with intermeshing gears 16, through the medium of which rotary motion is given the two shafts. A spring-arm 17 extends upwardly from the lower plate or base 2, and about midway its length is coiled, as at 18, and projected at a right angle to its stem portion to form a curved bearing-arm 19, which takes under the upper shaft 11 and serves to retain the same yieldingly up into the upper bearing-block 5.

Each of the shafts is provided at its end with rolls 20 and 21, the upper roll 20 having its inner end provided with inclined flanges 22 and the lower roll 21 with corresponding bevels 23. The upper roll is also provided with a longitudinal tapered fin or rib 24, and the lower roll with the corresponding groove 25, said grooves and ribs being formed upon diametrically-opposite sides of the rolls. Stove-pipe sections, the ends of which are subjected to the action of these rolls, are adapted to be assembled with facility, and when assembled not only prevent lateral movement one upon the other, but the groove and rib being tapered toward their inner ends closely bind upon each other and serve to prevent accidental separation. In rear of the rolls I may or may not provide separate molding-rolls 25ª to form the usual ogee form or other form of moldings, and in either instance provide each shaft at its ends with a binding-screw 26. In lieu of the molding-rolls I may provide plain spacing-sleeves, thus omitting the molding of the pipe, and as these rolls are all removable I may substitute a plain sleeve for the rolls 20 and 21, thus simply forming the molding upon the pipe, and, if desired, the crimping of the same.

27 represents a standard, the lower end of which is flared to form a base 28, and terminates in a reduced depending threaded stud 29, having a foot-nut 30, the stud being designed to be inserted through an opening in a work-bench or other fixed object, and by this means the machine bound securely in position thereupon. The upper end of the standard 27 is provided with an internally-bored collar 31, through which is inserted a set-screw 32, said collar receiving a depending stud 33 from the lower surface of the base tube, said base being radially adjustable upon the standard 27.

From one of the forward vertical standards 6, that secures the two plates of the machine together, there is adjustably mounted an arm 34, said arm being adjustable by means of a set-screw 35, passing through the standard and bearing thereupon. The free end of the arm is provided with an adjusting-plate 38, having semicircular openings or recesses 39 at its opposite edges to permit of its location between the shafts 11 and 15. By means of this plate the depth of crimp is determined, as will be readily apparent to persons conversant with sheet-metal working.

The construction of the crimping-rolls constitute the gist of the invention.

The tapered crimping rib or fin, with its companion groove, is of peculiar construction. They are nearly one-eighth of an inch deep at the inner edge and one-fourth of an inch wide, and they gradually decrease in width and depth until at the outer end they scarcely make an impression on the pipe. The inclined flange 22 and bevel 23 on the crimping-rolls serve to turn about three thirty-seconds of an inch bevel in the end.

Having described my invention, what I claim is—

1. In a machine of the class described, the combination, with opposite shafts, of a pair of rolls, one mounted upon each shaft, one of said rolls terminating in an annular beveled flange and provided with longitudinal tapered superficial bead and the opposite of said rolls terminating in a beveled edge to coact with the flange of the companion roll and with a longitudinal tapered groove to coact with the superficial bead of said companion roll, substantially as specified.

2. In a machine of the class specified, the crimping-rolls operated simultaneously in opposite directions, one of the rolls having a longitudinal tapered superficial bead 24 and the other roll provided with a longitudinal tapered groove 25 to co-operate with the bead, and the separate molding-rolls 25$^a$ at the ends of each crimping-roll, as set forth.

In testimony that I claim the foregoing as my own I have hereto affixed my signature in presence of two witnesses.

BARTLEY D. McDOWELL.

Witnesses:
EDWARD W. LANGE,
REUBEN P. HOLLINSHEAD.